(12) United States Patent
Dominguez Romero et al.

(10) Patent No.: US 9,326,010 B2
(45) Date of Patent: Apr. 26, 2016

(54) DOWNLOADING VIDEO IN MOBILE NETWORKS

(75) Inventors: Francisco Javier Dominguez Romero, Madrid (ES); Andrea De Pasquale, Madrid (ES)

(73) Assignees: Vodafone Group PLC, Newbury, Berkshire (GB); Vodafone Espana, S.A.U., Alcobendas (ES)

( * ) Notice: Subject to any disclaimer, the term of this patent is extended or adjusted under 35 U.S.C. 154(b) by 718 days.

(21) Appl. No.: 13/422,976

(22) Filed: Mar. 16, 2012

(65) Prior Publication Data

US 2012/0236720 A1     Sep. 20, 2012

(30) Foreign Application Priority Data

Mar. 17, 2011   (ES) .................................. 201130372
Feb. 29, 2012   (EP) .................................. 12157443

(51) Int. Cl.

| | |
|---|---|
| *G01R 31/08* | (2006.01) |
| *H04N 21/2381* | (2011.01) |
| *H04L 29/06* | (2006.01) |
| *H04N 21/238* | (2011.01) |
| *H04N 21/2385* | (2011.01) |
| *H04N 21/24* | (2011.01) |
| *H04N 21/61* | (2011.01) |

(52) U.S. Cl.
CPC ........ *H04N 21/2381* (2013.01); *H04L 65/4084* (2013.01); *H04L 65/4092* (2013.01); *H04L 65/80* (2013.01); *H04N 21/2385* (2013.01); *H04N 21/23805* (2013.01); *H04N 21/2402* (2013.01); *H04N 21/6131* (2013.01)

(58) Field of Classification Search
CPC ....................................................... H04L 47/10
See application file for complete search history.

(56) References Cited

U.S. PATENT DOCUMENTS

| | | | |
|---|---|---|---|
| 2001/0014121 A1* | 8/2001 | Kaye et al. ............... | 375/240.03 |
| 2002/0118649 A1 | 8/2002 | Farley et al. | |
| 2003/0081692 A1 | 5/2003 | Kwan et al. | |
| 2003/0147389 A1* | 8/2003 | Zirwas ......................... | 370/390 |
| 2005/0152382 A1* | 7/2005 | Stirling et al. ................ | 370/403 |
| 2005/0239413 A1 | 10/2005 | Wiberg et al. | |

(Continued)

FOREIGN PATENT DOCUMENTS

| | | |
|---|---|---|
| EP | 2154837 A1 | 2/2010 |
| ES | 2334963 A1 | 3/2010 |
| WO | WO 2010/107348 | 9/2010 |

OTHER PUBLICATIONS

Spanish Search Report for 201130372 dated Mar. 17, 2011.

(Continued)

*Primary Examiner* — Samina Choudhry (74) *Attorney, Agent, or Firm* — Workman Nydegger (57) ABSTRACT

A method and network entity for downloading detected video packets. A minimum bit rate MinBR equals ViBR+M, where M≥0 is a configurable bit rate margin from an estimated video bit rate ViBR. A specific bit rate SBR is greater than MinBR. The method uses MinBR and SBR as a minimum bit rate limit and a maximum bit rate limit respectively between which the bit rate for delivering video in case of congestion is defined. The method can further compare the predefined specific bit rate with a real throughput of the user requesting video download with a QoS profile, and if there is congestion and if the throughput is larger than or equal to SBR, the priority value of a QoS profile to be used for downloading video in case of congestion.

20 Claims, 5 Drawing Sheets

(56) References Cited

U.S. PATENT DOCUMENTS

| | | | |
|---|---|---|---|
| 2006/0094472 A1 | 5/2006 | Othmer et al. | |
| 2008/0259834 A1 | 10/2008 | Joung et al. | |
| 2008/0281697 A1* | 11/2008 | Whitehead | 705/14 |
| 2009/0133075 A1* | 5/2009 | Nishina et al. | 725/54 |
| 2009/0328124 A1* | 12/2009 | Khouzam et al. | 725/116 |
| 2010/0067400 A1 | 3/2010 | Dolganow et al. | |
| 2010/0161825 A1* | 6/2010 | Ronca et al. | 709/231 |
| 2010/0169482 A1* | 7/2010 | Tang et al. | 709/224 |
| 2011/0216661 A1* | 9/2011 | Imai et al. | 370/252 |

OTHER PUBLICATIONS

Wikipedia, "Deep Packet Inspection", retrieved online Apr. 17, 2013 http://en.wikipedia.org/wiki/Deep_packet_inspection.
European Search Report for EP 12 15 7443 dated Apr. 16, 2014.
Rebecca Copeland: "Network Intelligence -facilitate operators win in mobile broadband era", Intelligence in Next Generation Networks, 2009. ICIN 2009. 13th International Conference on, IEEE, Piscataway, NJ, USA, Oct. 26, 2009, pp. 1-6, XP031582815, ISBN: 978-1-4244-4693-3, -section 4.1 * figure 1 *.
"Digital cellular telecommunications system (Phase 2+ ); Universal Mobile Telecommunications System (UMTS); LTE; Quality of Service (OS) concept and architecture (3GPP TS 23.107 version 10.0.0 Release 10)", Technical Specification, European Telecommunications Standards Institute (ETSI), 650, Route Des Lucioles; F-06921 Sophia-Antipolis; France, vol. 3GPP SA 2, No. V10.0.0, Mar. 1, 2011, XP014064714, p. 18* p. 37* tables 6,7.
Garriga B et al: "QoS Load Differentiation Application in a UTRAN Live Network", 2009 IEEE 69th Vehicular Technology Conference; April 26-29, 2009, Barcelona, Spain, IEEE, Piscataway, NJ, USA, Apr. 26, 2009, pp. 1-8, XP031474768, ISBN: 978-1-4244-2517-4, abstract *.
Klaus I Pedersen et al: "QoS Considerations for HSDPA and Performance Results for Different Services", 2006 IEEE 64th Vehicular Technology Conference : VTC 2006-Fall ; Sep. 25-28, 2006, Montreal, Quebec, Canada, Piscataway, NJ : IEEE Operations Center, Sep. 1, 2006, pp. 1-5, XP031051532, ISBN: 978-1-4244-0062-1, abstract *.

* cited by examiner

DOWNLOADING VIDEO IN MOBILE NETWORKS

CROSS-REFERENCE TO RELATED APPLICATIONS

This application claims priority to Spanish Patent Application No. P201130372, filed Mar. 17, 2011 and European Patent Application No. 12157443.8, filed Feb. 29, 2012, both of which are incorporated herein by reference in their entireties.

TECHNICAL FIELD OF THE INVENTION

The present invention has its application within the telecommunications sector and, especially, in the industrial area engaged in providing Radio Access Networks (RANs) with elements of cellular infrastructures such as Radio Network Controllers (RNCs) and Radio Base Stations (Nodes B) for Third Generation (3G) wireless communications systems or beyond 3G networks (supporting HSPA, HSPA+, LTE, . . . ).

More particularly, the invention described herein relates to a method and a (3G or beyond 3G) network entity for handling video traffic with a granted Quality of Service (QoS) and an optimized use of Radio Resources in case of traffic congestion.

BACKGROUND OF THE INVENTION

Video is by far the predominant type of traffic by volume in the Mobile networks (the video traffic load in a typical RNC can be about 40% of the total volume, from which 61% of HTTP traffic is video contribution to volume, which in turn equates to 40% of all traffic since HTTP forms 66% of all traffic). The largest number of the traffic video downloads is carried out via HTTP progressive downloading (the video file is actually downloaded to the end users equipment, for example, through a browser such as YouTube). The remaining video downloads use streaming media servers.

On the other hand, it has been estimated that one in four users cancels a video stream early after initiating its download. Thus, considerable RAN resources are wasted in delivering the video, since an amount of video is already downloaded and buffered in advance of the point in the stream at which the user aborts the viewing session.

Moreover, the growth rate of data traffic (including video) is increasing twofold in less than one year. However, the revenues coming from the data traffic are not rising at the same tempo, which leads to the necessity to control the data traffic based on network resources.

The application specific traffic optimization in a wireless link disclosed by US 2002/0118649 is mainly concerned of detecting the data type of the packets carried on a wireless connection by examining their link performance characteristics, such as a port number, and with the assessment of data types, in the case of audio and video, certain link control parameters that govern the transport of the packets are determined and applied to. The computation of said link control parameters is based on fixed preconfigured values, a mere determination of a particular, static, packet flow model as a consequence of the classification of the data.

SUMMARY OF THE INVENTION

The present invention serves to solve the aforesaid problem by controlling the video bit rate provided by the mobile network and ensuring:

i) The minimum video bit rate requested by the end user is fulfilled by the mobile network. This leads to a good end customer experience by avoiding that the provided video bit rate becomes lower than the requested minimum video bit rate, which affects directly to the user satisfaction because in the latter case the video delivery is stopped and buffering very often as explained before.

ii) The use of the mobile network resources is optimised in case of congestion by avoiding the download of a video volume larger than the needed volume to be delivered, i.e., no download at a bit rate higher than a specified video bit rate is allowed in order to optimise the mobile network delivery of the video traffic type even in the case of radio resources congestion.

An aspect of the invention refers to a method for downloading video data packets to a user terminal over a mobile telecommunication network, comprising the steps of:
  detecting video data packets in a packet data flow addressed to the user terminal,
  determining a video bit rate ViBR of the video data packets,
  determining a minimum bit rate MinBR, where the minimum bit rate MinBR is greater than or equal to the previous determined video bit rate ViBR,
  determining a specific bit rate SBR, where the specific bit rate SBR is substantially greater than the minimum bit rate MinBR, and
  transporting the video packets to the user terminal over the mobile telecommunications network using a bit rate for video packet data delivery which is set dynamically, the mobile telecommunications network transport mechanism which is applied to deliver the video packets using the minimum bit rate MinBR and specific bit rate SBR to set the lower and upper limits of said bit rate for video packet data delivery to the user terminal.

In addition, the proposed method may further include detecting the congestion level in at least a part of the mobile telecommunication network. In particular, the detection of congestion level may include a step of checking whether there is congestion of the radio resources or not in the mobile telecommunications network.

In case of congestion in the radio (access) network (RAN) of said mobile network, the method ensures the downloading of the video packets at a suitable bit rate OBR which has a value between the previously set values of the specific and the minimum bit rates, more concretely: $SBR \geq OBR \geq MinBR$.

In order to provide something better than "best effort" in a loaded network (the aforementioned case of congestion in the RAN), the minimum bit rate MinBR can be defined so that a user can send data at a higher rate than this limit. This MinBR is a parameter that the network tries to fulfil unless the congestion is so high that this goal is impossible. Then, when possible, the RNC ensures the minimum bit rate at the resources level and at the Iub interface. Also the Node B fulfils this minimum bit rate when giving priorities in the scheduler.

Preferably, the minimum bit rate MinBR can be assigned to a QoS parameter indicating a bit rate selected from nominal or minimum bit rate used by radio resources.

In the context of this invention and in accordance to the 3rd Generation Partnership Project (3GPP), a QoS profile is associated with each communication session and defines the performance expectations placed on the bearer network. The QoS profile comprises a number of QoS parameters, typically: traffic class, service priority (e.g. Allocation Retention Priority ARP and traffic handling priority THP), delay class, reliability, and throughput in terms of mean and peak bit rates.

The step of checking congestion in the radio network preferably comprises comparing the configured specific bit rate SBR with a real throughput value provided to the user, and if the throughput value is larger than or equal to the specific bit rate for redistribution SBR, the priority value of the QoS profile used for downloading the video packets (e.g., ARP or THP) is decreased.

The step of detecting the video packets can be carried out in the radio network (RAN), in the core network (CN) or in a third party network having a packet switching (PS) interface to the mobile network. In the radio network, the detection of the video packets can be performed by a network entity which can be implemented in a controller node (e.g., Radio Network Controller) or in a base station (e.g., Node B). The other options of implementation refer to the detection of the video packets either by a core network entity or by a network entity which provides PS to carry packet traffic from/to the mobile network.

The step of estimating the video bit rate can also be carried out in the RAN (performed by a network controller or a base station), in the CN or in a third party network having a PS interface to the mobile network.

However, the steps of setting the minimum and the specific bit rates, MinBR and SBR respectively to ensure the QoS of the video packets (using MinBR) and checking whether there is congestion in the radio access network (using SBR), can only be performed in the radio access network, for example, by the radio network controller (RNC), a Node B or an enhanced Node B (e.g., an evolved HSPA Node B in a flat architecture or an eNode B in LTE).

Another aspect of the invention deals with network entity of the radio network which comprises processing means for performing the method described before. This network entity can be implemented in a node serving as a controller (e.g., RNC) or as a base station (e.g., Node B or eNode B).

A further aspect of the invention refers to a computer program product which comprises program code means to be loaded into processing means of a radio network entity (RNC, Node B, eHSPA Node B, eNode B, . . . ) in order to execute the described method for downloading video.

The main advantages of the invention are ensuring QoS of video services as well as avoiding waste of bandwidth when video downloading. The proposed solution of video download optimisation over the network is adapted both to guarantee a suitable minimum bit rate (depending upon video traffic type and QoS parameters native to the radio access network) and to cause the volume of downloaded video data to approximate the volume actually required (i.e. downloading video at a bit rate no higher than the user is entitled to). The latter is particularly important in congested radio network conditions.

Some important differences of the invention with respect to the prior art, for instance, in comparison with the optimised transfer model described in aforementioned US 2002/0118649, are related to the fact that the solution here described deals with shared radio resources with "effective" bit rates and QoS considerations that does not arise in the wireless link that is US 2002/0118649 concern. Furthermore, unlike US 2002/0118649, which simply proposes to fix a particular data flow model according to a classification of data type, the present invention chooses whether to apply the method of video download optimisation at all (on the basis of measured congestion level of at least one part of the network) and, once applied, allows the bit rate to be steered between upper and lower bounds which themselves are set dynamically (not in a static manner as US 2002/0118649 discloses) in accordance with the congestion level, priority level etc. For example, to name but a few differences, there is neither detection of video packets though video codec information nor via Uniform Resource Locators (URLs) in US 2002/0118649 and, hence, there is no possible calculation of bit rates on the radio link and QoS parameters based on said detection of video packets.

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DETAILED DESCRIPTION OF THE INVENTION

A preferred embodiment of the invention is focused on the Radio Network which is usually the bottleneck of the mobile networks and comprises the following steps:

Trigger the detection of traffic based on load
Detect the video traffic type.
Estimate the video bit rate.
Ensure the minimum bit rate of the video.
Optimise the use of radio resources in case of congestion.

1. Trigger the Detection of Traffic Based on Load

As the traffic inspection is something that consumes a lot of processing, it is optionally preferred that the traffic detection is activated when the load of any of the following network elements is higher than a specific threshold predefined by the mobile network operator:

Cell load or load of the Node B towards which the traffic is directed.
load on the Iub interface (Iub congestion) of the Node B of the users.
load in the RNC User Plane (user traffic load of the processing means of the RNC) managing those users to be inspected.

2. Detect the Video Traffic Type

This task can be carried out inside the Radio Network or outside the Radio Network (Core Network or Third party Network with PS interface to the Mobile Network carrying video packets) and in two ways:

By doing packet inspection of the traffic. In this case it is needed to inspect the TCP/IP packets, going inside the HTTP protocol and detecting that there is a video transmission. The YouTube traffic is not encrypted and it arrives to the RNC without any ciphering, therefore it is possible to inspect the packets and detect the video transmission. The drawback of this solution is the high processing requirements.

By checking the statically allocation of IP address. In this case, it is needed to configure the IP addresses with videos transmission. For example, the IP addresses of YouTube are configured. In this case it is only needed to inspect the IP protocol which is lighter than inspecting TCP/HTTP protocols in terms of processing resources. The only handicap is that in the video web pages, there are some pages without video transmission. In this case, it can be optionally estimated that there is a video download and set a threshold of bytes quantity of page download, hence, when the page download volume is exceeded, it is estimated that there is a video download.

3. Estimate the Video Bit Rate

It is possible to get an accurate detection of the video bit rate, denoted by ViBR, through the packet inspection. There are two types of videos:

Constant bit rate (CBR) videos: This was found to be the 90% of the videos from YouTube. In this case in the Flash Video meta-data it is specified the video bit-rate in the beginning of the file.

For the rest of the videos that do not contain this meta-data (Variable-Bit-Rate, or VBR videos), it is possible to estimate the average bit rate inspecting during some seconds the variable instantaneous bit rate.

It is also possible to do a preconfigured video bit rate to reduce the processing resources used. It was found that the YouTube videos have three clear peaks: Most videos have a bit-rate around 330 kbps, with two other peaks at around 285 kbps and 200 kbps. Then, it is possible to have a parameter configurable by the operator to choose which bit rate to use. Today, as most of the videos are around 330 Kbps, and this value is higher than the other two peaks, 330 Kbps is a preferred value.

The estimation of the video bit rate in any of the ways described before can be performed at:

The RNC, which directly performs the packet inspection or the static pre-configuration.

The Node B or eNodeB.

The packet inspection can be done also outside the Radio Network: In a network element of the Core Network or any other equipment that has access to an interface carrying the packet traffic of the mobile network.

Figure 3:
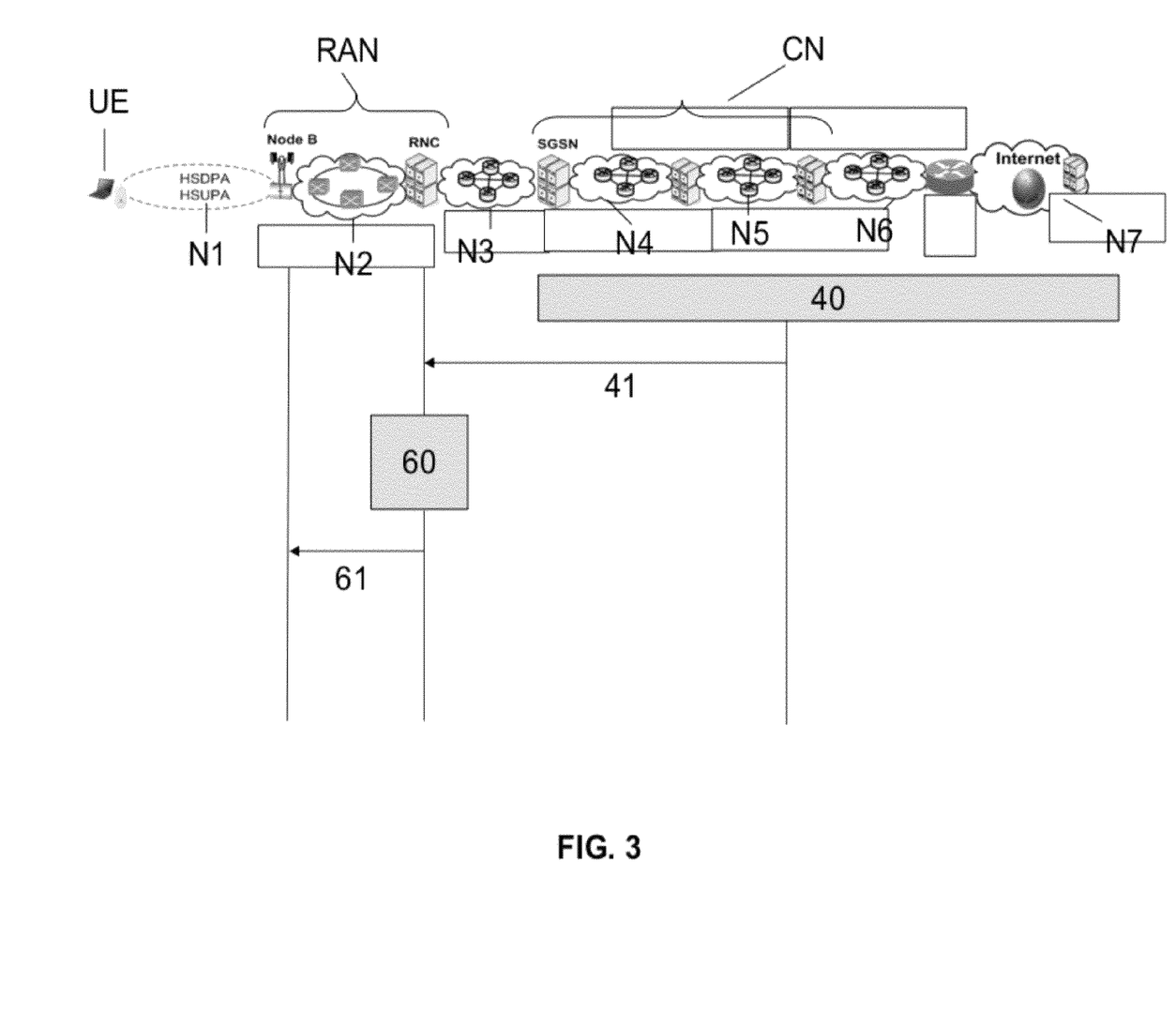
FIG. 3 illustrates the signalling flow when the detection of the video and the video bit rate estimation are performed out of the Radio Network.
Figure 4:
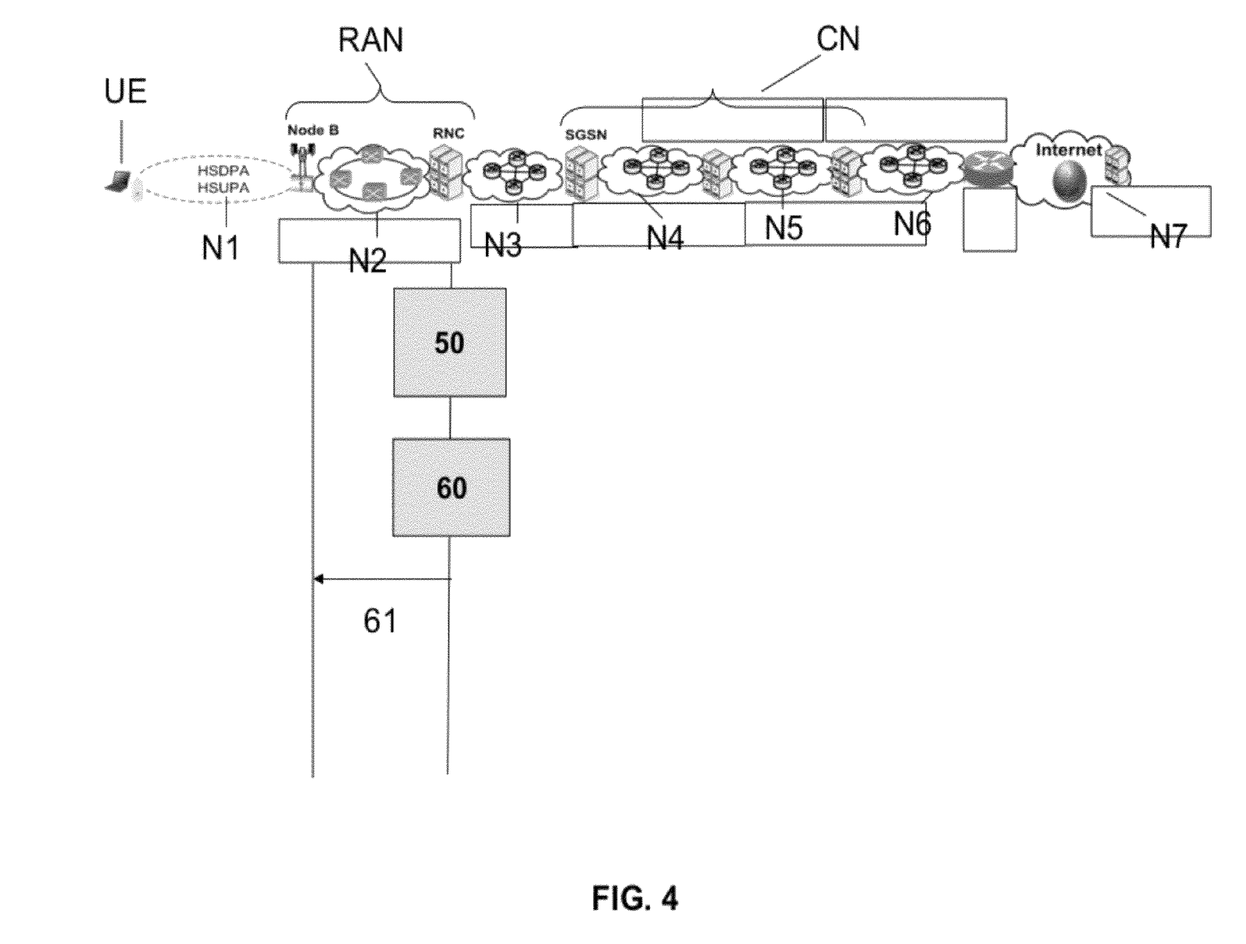
FIG. 4 illustrates the signalling flow when the detection of the video and the video bit rate estimation are performed in the Radio Network.

As shown in FIGS. 3 and 4 respectively, this step 3 for estimating the Video Bit Rate ViBR and the previous step 2 of video traffic detection can be performed in the Radio Network RAN both by the RNC, as well as by other network entities out of the Radio Network, for example, in the Core Network CN.

User equipment UE, which requests for video download, is connected to a 3G base station, Node B, through Uu air interface (N1), for instance, using HSDPA. The Node B communicates with the RNC through Iub interface in a backhaul network (N2). The Radio Network RAN is connected to a PS entity network, such as a Serving GPRS Supporting Node SGSN, through IuPS interface (N3). Within the Core Network CN, as shown in FIG. 3, video traffic can be detected 40 in any entity, for instance, from the Gn network (N4) or Gi network (N5). FIG. 3 shows that traffic can be detected (40) also by a third party network (N6), for example, a provider network of IP service optimization solutions for service providers (N7), such as Internet Service Providers, e.g., Google. FIG. 3 shows the signalling needed when step 2 and 3 are performed out of the RAN: the packet inspection for the step 2 of video detection (40) is performed out of the Radio Network, but the RNC performs the step of calculating MinBR and SBR (42) from the ViBR estimated in the step 3, obtained outside too. Thus, it is needed to send this Video Bit Rate estimation to the RNC by a proprietary signalling message (41), created for that specific purpose because there is no such message in the 3G standards. Then, the RNC uses it to calculate the MinBR and SBR (60) and, in turn, sends them in a standard signalling message to the Node B (61).

In FIG. 4, once video traffic is detected (50) in the RAN by the RNC and sets ViBR by itself to calculate the MinBR and SBR (60), sent to the Node B using a standardized signalling message (61).

4. Ensure the Minimum Bit Rate of the Video

In order to guarantee a good quality of service of the video watching, the QoS parameters already implemented at the UMTS Radio Access Network—UTRAN—can be used. There is a parameter called Nominal Bit Rate or Minimum Bit Rate, which is a kind of "guaranteed bit rate" for interactive/background classes of services. In 3GPP there is no Guaranteed Bit Rate for the Interactive/Background services defined at the Home Location Register—HLR—containing the QoS profiles of the users (it is only available for Conversational and Streaming classes), but in the radio it is possible to have the nominal or minimum bit rate. This nominal bit rate is a target for the RNC/Node B to try to ensure that the user have this minimum bit rate unless there is a very high congestion.

Then, for the videos services, once they are detected and the video bit rate ViBR is estimated, it is possible to use the estimated bit rate value MinBR as either Nominal Bit Rate either Minimum Bit Rate. It is also possible to include a margin in order to ensure a good quality in case of temporary bad quality or congestion state.

5. Optimise the Use of Radio Resources in Case of Congestion

The target of this step is to optimise the use of the mobile network resources in order to not download more than the volume needed especially in case of the congestion of radio resources. So, in practical terms the target is:

If there is no congestion in the UTRAN, then leave the user to download as much as possible.

If there is congestion, then do not download higher than a specific bit rate SBR, which is high enough to ensure the quality of video.

Figure 1:
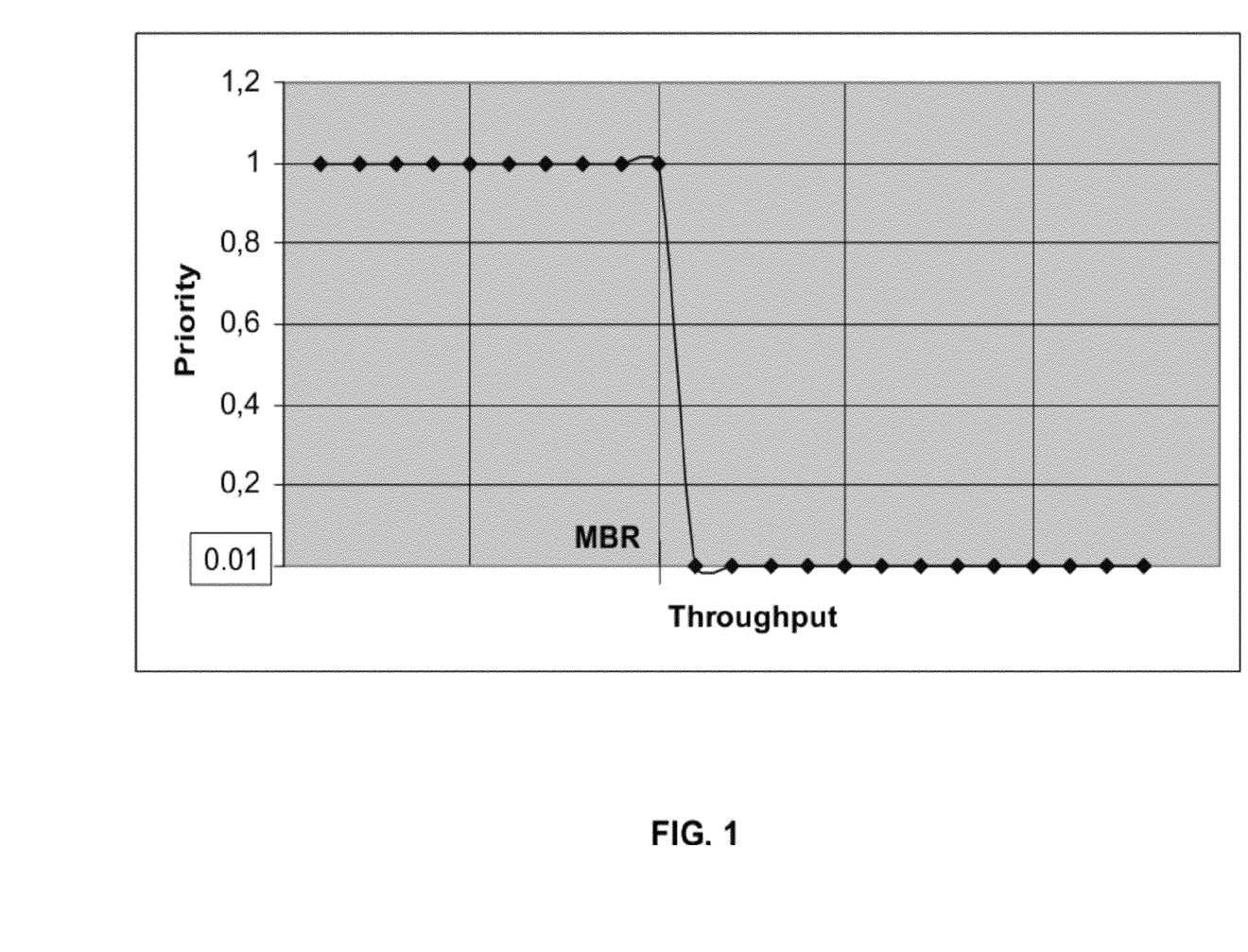
FIG. 1 illustrates a graphical representation of the optimisation of the mobile network resources used for video transmission in case of congestion, according to embodiments of the invention.
Figure 2:
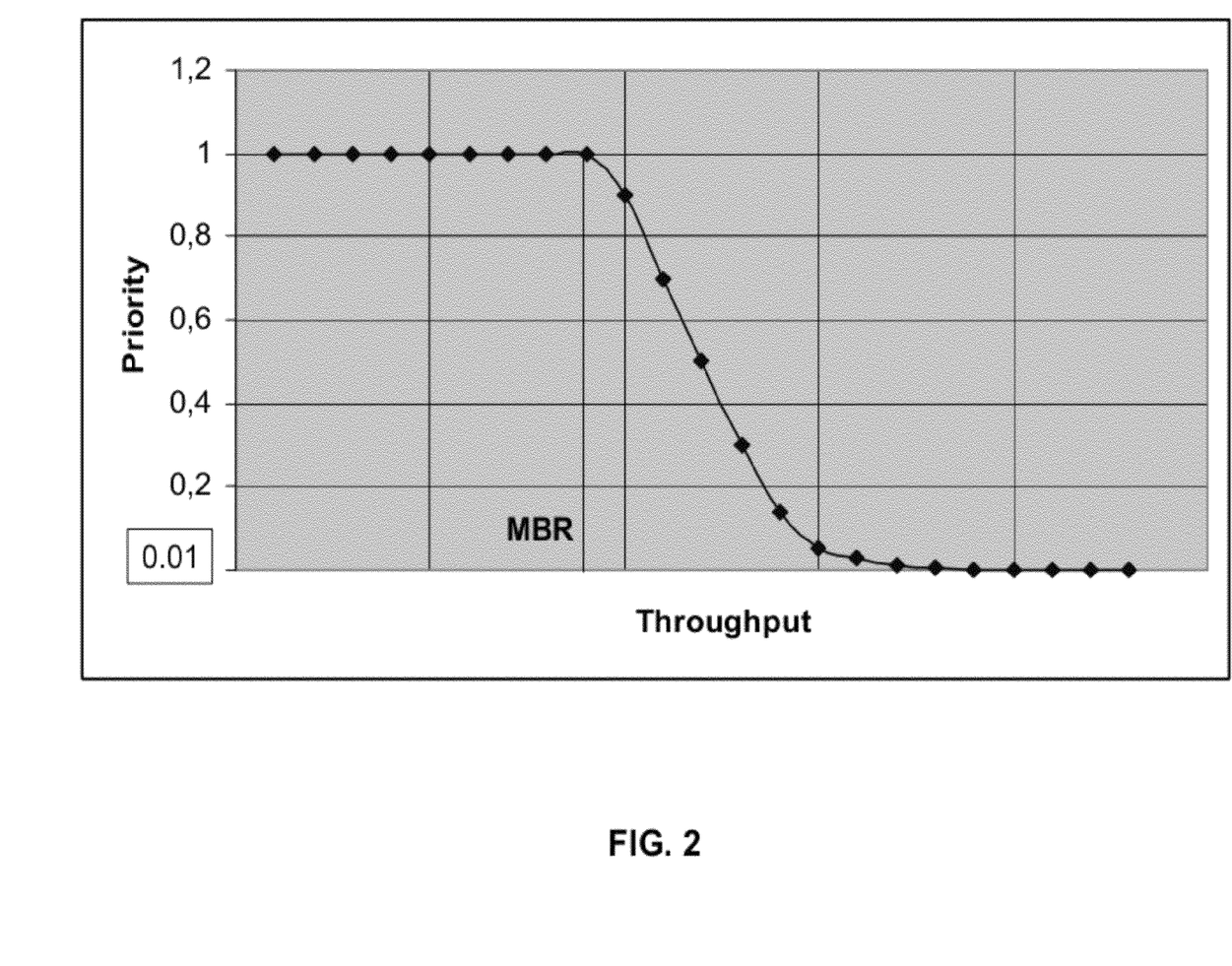
FIG. 2 illustrates a graphical representation of the optimisation of the mobile network resources used for video transmission in case of congestion, according to embodiments of the invention.

To get this optimisation implemented, it is possible to modify the Priority (provided by the QoS profile) of the user. When the user's packets are in the scheduler or in any queue at RNC/Node B, their scheduling priority depends on the instantaneous bit rate of the user. There, it is used the SBR. If the throughput of the user's packets is higher than SBR, the priority of said user is decreased. Different functions can be implemented to vary the priority as shown in FIGS. 1 and 2. FIG. 1 shows a simple implementation wherein the priority P of the user is reduced drastically from the default value (e.g. P=1) to a lower value (e.g. P=0.01) when the throughput surpasses the predefined SBR. In FIG. 2, the graphic shows the priority of the user versus the throughput and how the reduction of the priority when SBR is reached is smoother and linear. Generally, the priority function is based on proportional fair plus the illustrated functions (FIGS. 1 and 2 are just some examples).

Figure 5:
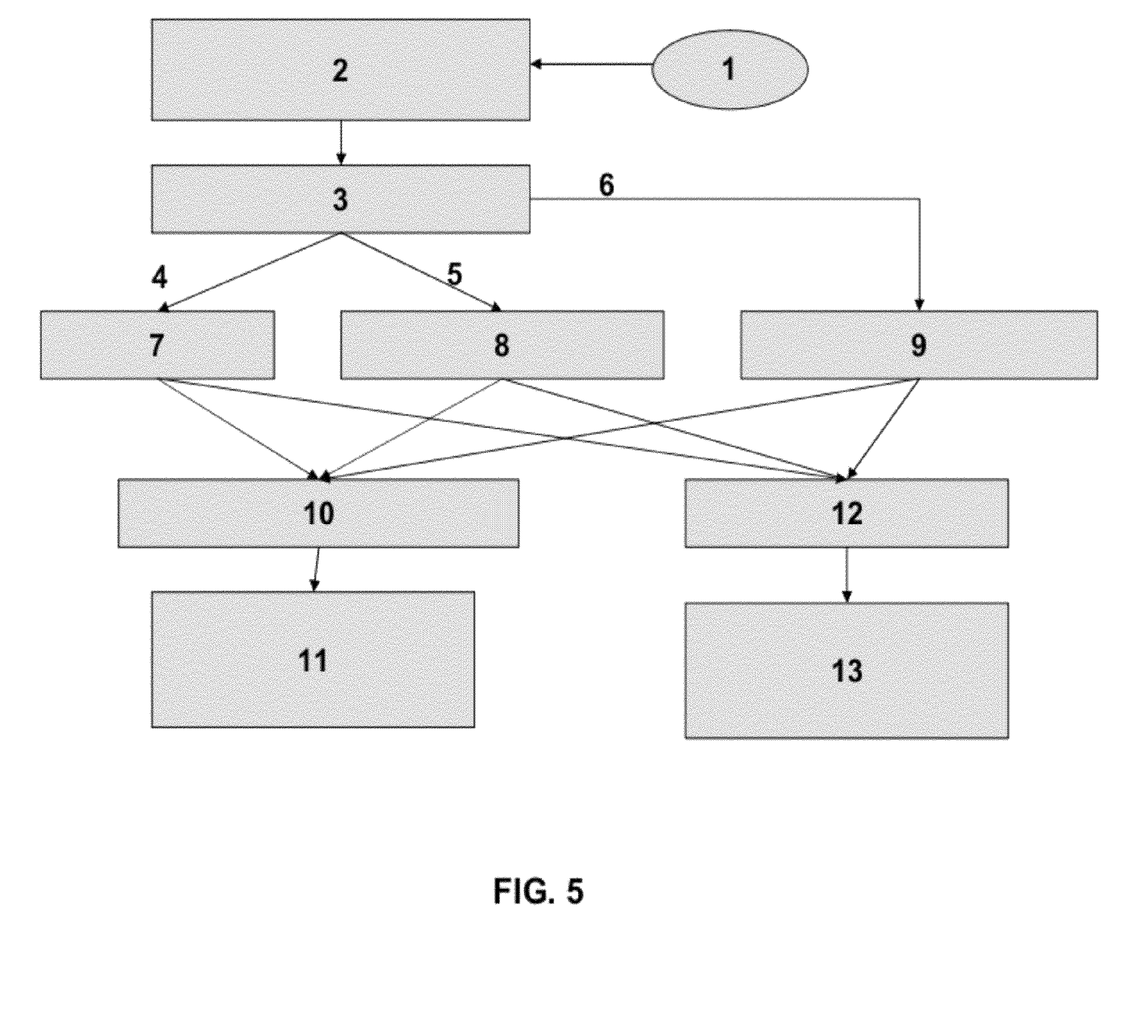
FIG. 5 illustrates a flowchart of the steps for optimised video delivery over a mobile network using the minimum bit rate and specific bit rate which are determined according to a preferred embodiment of the invention.

FIG. 5 shows a diagram of the main steps performed by the radio network to optimize the radio resources for delivering video traffic to user equipment, in accordance to a preferred implementation of the invention. As checking the load parameters (1) of the serving cell, the Node B, the RNC User Plane and Iub interface, if any of them is higher than a specific load threshold value, then traffic inspection (2) is triggered to detect the traffic type of the packets for the user. The packets of the user are inspected by examining the HTTP packets (e.g., by a HTTP sniffer) in order to determine whether the traffic type of the packets corresponds to a video transmission (3) and which type of video transmission is being handled. In case of a CBR video transmission (4), a video bit rate ViBR is determined as the bit-rate specified in the beginning of the video file (7). In case of a VBR video transmission (5), a video bit rate ViBR is estimated as the bit-rate calculated in average taking the bytes transmitted over some seconds (8). If no estimation of the video traffic type is possible, a video bit rate ViBR is set as a static bit rate (e.g., 330 kbps) configured by the service providers/operators per IP address of the video servers. In any case, a minimum bit rate MinBR is calculated (10) as MinBR=ViBR+M, wherein M≥0 denotes a configurable margin of bit rate; MinBR, ViBR and M are measured in bits per second. Also, for any type of video traffic and user, a specific bit rate SBR is determined (12), being SBR>MinBR. These two parameters, SBR and MinBR are computed by the controller entity of the radio network (e.g., the RNC) and sent to the base stations (e.g., the Node B) for their application in the transport mechanism. In the case that ViBR was previously set as a static bit rate, the specific bit rate SBR is used to modify the Scheduling Priority Indication, SPI, weight function (13) used by, for example a HSDPA scheduler in the Node B. Otherwise, that is, in the case that the video traffic type is known, CBR or VBR cases, the minimum bit rate MinBR calculated with the estimated video bit rate ViBR and a margin is used as a Nominal Bit Rate parameter (11) in the Iub/Uu interfaces in order to guarantee QoS and radio resources, i.e., to grant certain bandwidth in the transport interface—Iub—and power/codes in the radio interface—Uu—.

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. A method for downloading video data packets to a user terminal over a mobile telecommunication network, comprising:
    detecting video data packets in a packet data flow addressed to the user terminal by performing a packet inspection of the packet data flow,
    determining a video bit rate, ViBR, of the video data packets, based on the packet inspection,
    determining a minimum bit rate, MinBR, of the video data packets, where the minimum bit rate MinBR is greater than or equal to the video bit rate ViBR,
    determining a specific bit rate SBR of the video data packets, where the specific bit rate SBR is substantially greater than the minimum bit rate MinBR, and
    transporting the video data packets of the packet data flow to the user terminal over the mobile telecommunications network using a dynamically set bit rate for video packet data delivery to the user terminal and using the minimum bit rate, MinBR, and the specific bit rate, SBR, to set lower and upper limits of said dynamically set bit rate for video packet data delivery to the user terminal,
    wherein determining the video bit rate, ViBR, of the video data packets comprises:
    determining from the packet inspection a type of video transmission the video data packets correspond to, the type being one of: a constant bit rate and a variable bit rate,
    if the type of video transmission is determined to be a constant bit rate, determining the video bit rate ViBR to have a bit rate value read from a field of the video data packets, and
    if the type of video transmission is determined to be a variable bit rate, determining the video bit rate ViBR to have an estimated bit rate value.

2. The method according to claim 1, further comprising:
    checking whether there is congestion of radio resources in the mobile telecommunication network; and
    in response to determining that that there is congestion, downloading the video data packets of the packet data flow at a bit rate, OBR, of the video data packets, which is larger than or equal to the minimum bit rate MinBR, and lower or equal to the specific bit rate SBR so that SBR >OBR >MinBR.

3. The method according to claim 2, wherein checking whether there is congestion comprises:
    comparing the specific bit rate SBR with a throughput value provided to a user requesting video download with a QoS profile, and
    in response to determining that the throughput value is larger than or equal to the specific bit rate SBR, decreasing a priority value of the QoS profile, the priority value being used for downloading the video data packets of the packet data flow in case of congestion.

4. The method according to claim 1, wherein the minimum bit rate MinBR is assigned to a QoS parameter indicating a video data packets bit rate selected from a nominal bit rate used by the radio resources and a minimum bit rate used by the radio resources.

5. The method according to claim 1, wherein determining the video bit rate ViBR of the video data packets comprises:
    determining from the packet inspection a type of video transmission the video data packets correspond to, the type being one of: a constant bit rate and a variable bit rate;
    if the type of video transmission is determined to be a constant bit rate, determining the video bit rate ViBR to have a bit rate value read from a field of the video data packets; and
    if the type of video transmission is determined to be a variable bit rate, determining the video bit rate ViBR to have an estimated bit rate value.

6. The method according to claim 5, wherein the estimated bit rate value is a fixed value configured by the mobile network operator.

7. The method according to claim 6, wherein the estimated bit rate value is fixed to 330 kbps.

8. The method according to claim 1, wherein detecting the video data packets comprises:
    detecting TCP/IP and HTTP packets, during the packet inspection of the packet data flow, which carry said video data packets; and
    detecting video transmission within the inspected TCP/IP and HTTP packets.

9. The method according to claim 1, wherein detecting the video data packets comprises:
    detecting IP packets, during the packet inspection of the packet data flow, which carry said video data packets; and
    checking whether an IP address is statically allocated to video transmission.

10. A radio network entity, comprising:
    a base station; and
    a controller;

the radio network entity being operable to:
detect video data packets in a packet data flow addressed to a user terminal by performing a packet inspection of the packet data flow,
determine a video bit rate, ViBR, of the video data packets, based on the packet inspection,
determine a minimum bit rate, MinBR, of the video data packets, where the minimum bit rate MinBR is greater than or equal to the video bit rate ViBR,
determine a specific bit rate SBR of the video data packets, where the specific bit rate SBR is substantially greater than the minimum bit rate MinBR, and
transport the video data packets of the packet data flow to the user terminal over the radio network using a dynamically set bit rate for video packet data delivery to the user terminal and using the minimum bit rate, MinBR, and the specific bit rate, SBR, to set lower and upper limits of said dynamically set bit rate for video packet data delivery to the user terminal
wherein determine the video bit rate, ViBR, of the video data packets comprises:
determine from the packet inspection a type of video transmission the video data packets correspond to, the type being one of: a constant bit rate and a variable bit rate,
if the type of video transmission is determined to be a constant bit rate, determine the video bit rate ViBR to have a bit rate value read from a field of the video data packets, and
if the type of video transmission is determined to be a variable bit rate, determine the video bit rate ViBR to have an estimated bit rate value.

11. The radio network entity according to claim 10 which is implemented in a Node B.

12. The radio network entity according to claim 10 which is implemented in a RNC.

13. The radio network entity according to claim 10 which is implemented in an eNode B.

14. A computer program product, for use in a radio network entity including a processor and memory, for implementing a method for downloading video data packets to a user terminal over the radio network entity, the computer program product comprising one or more physical non-transitory computer readable medium having stored thereon executable instructions that, when executed by the processor, cause the radio network entity to:
detect video data packets in a packet data flow addressed to the user terminal by performing a packet inspection of the packet data flow,
determine a video bit rate, ViBR, of the video data packets, based on the packet inspection,
determine a minimum bit rate, MinBR, of the video data packets, where the minimum bit rate MinBR is greater than or equal to the video bit rate ViBR,
determine a specific bit rate SBR of the video data packets, where the specific bit rate SBR is substantially greater than the minimum bit rate MinBR, and
transport the video data packets of the packet data flow to the user terminal over the radio network using a dynamically set bit rate for video packet data delivery to the user terminal and using the minimum bit rate, MinBR, and the specific bit rate, SBR, to set lower and upper limits of said dynamically set bit rate for video packet data delivery to the user terminal
wherein determine the video bit rate, ViBR, of the video data packets comprises:
determine from the packet inspection a type of video transmission the video data packets correspond to, the type being one of: a constant bit rate and a variable bit rate,
if the type of video transmission is determined to be a constant bit rate, determine the video bit rate ViBR to have a bit rate value read from a field of the video data packets, and
if the type of video transmission is determined to be a variable bit rate, determine the video bit rate ViBR to have an estimated bit rate value.

15. The computer program product according to claim 14, wherein the one or more physical non-transitory computer readable medium have stored thereon executable instructions that, when executed by the processor, cause the radio network entity also to:
check whether there is congestion of radio resources in the mobile telecommunication network; and
in response to determining that that there is congestion, download the video data packets of the packet data flow at a bit rate, OBR, of the video data packets, which is larger than or equal to the minimum bit rate MinBR, and lower or equal to the specific bit rate SBR so that SBR >OBR >MinBR.

16. The computer program product according to claim 15, wherein check whether there is congestion comprises:
compare the specific bit rate SBR with a throughput value provided to a user requesting video download with a QoS profile, and
in response to determining that the throughput value is larger than or equal to the specific bit rate SBR, decrease a priority value of the QoS profile, the priority value being used for downloading the video data packets of the packet data flow in case of congestion.

17. The computer program product according to claim 14, wherein the minimum bit rate MinBR is assigned to a QoS parameter indicating a video data packets bit rate selected from a nominal bit rate used by the radio resources and a minimum bit rate used by the radio resources.

18. The computer program product according to claim 14, wherein detect the video data packets comprises:
detect TCP/IP and HTTP packets, during the packet inspection of the packet data flow, which carry said video data packets; and
detect video transmission within the inspected TCP/IP and HTTP packets.

19. The computer program product according to claim 14, wherein detect the video data packets comprises:
detect IP packets, during the packet inspection of the packet data flow, which carry said video data packets; and
check whether an IP address is statically allocated to video transmission.

20. The method according to claim 5, wherein the estimated bit rate value is an average bit rate estimated by measuring the variable bit rate for certain time instants.

* * * * *